March 7, 1967 J. G. VALASSIS 3,308,447

ELECTRICALLY ALTERABLE SEMI-PERMANENT MAGNETIC MEMORY

Filed Nov. 23, 1962 11 Sheets-Sheet 1

INVENTOR.
JOHN G. VALASSIS
BY
C. A. Gulbrandsen
ATTY.

March 7, 1967 J. G. VALASSIS 3,308,447

ELECTRICALLY ALTERABLE SEMI-PERMANENT MAGNETIC MEMORY

Filed Nov. 23, 1962 11 Sheets-Sheet 2

INVENTOR.
JOHN G. VALASSIS
BY
C. A. Gulbrandsen
ATTY.

March 7, 1967 J. G. VALASSIS 3,308,447

ELECTRICALLY ALTERABLE SEMI-PERMANENT MAGNETIC MEMORY

Filed Nov. 23, 1962 11 Sheets-Sheet 3

INVENTOR.
JOHN G. VALASSIS
BY
[signature]
ATTY.

INVENTOR.
JOHN G. VALASSIS
BY
C. R. Gulbrandsen
ATTY.

March 7, 1967 J. G. VALASSIS 3,308,447

ELECTRICALLY ALTERABLE SEMI-PERMANENT MAGNETIC MEMORY

Filed Nov. 23, 1962 11 Sheets-Sheet 5

INVENTOR.
JOHN G. VALASSIS

BY

[signature]
ATTY.

INVENTOR.
JOHN G. VALASSIS
BY
C. A. Gullbrandsen
ATTY.

INVENTOR.
JOHN G. VALASSIS
BY
ATTY.

March 7, 1967 J. G. VALASSIS 3,308,447

ELECTRICALLY ALTERABLE SEMI-PERMANENT MAGNETIC MEMORY

Filed Nov. 23, 1962 11 Sheets-Sheet 8

INVENTOR.
JOHN G. VALASSIS

BY

ATTY.

INVENTOR.
JOHN G. VALASSIS
BY
C. A. Gulbrandsen
ATTY.

March 7, 1967 J. G. VALASSIS 3,308,447

ELECTRICALLY ALTERABLE SEMI-PERMANENT MAGNETIC MEMORY

Filed Nov. 23, 1962 11 Sheets-Sheet 10

INVENTOR.
JOHN G. VALASSIS

BY

ATTY.

ELECTRICALLY ALTERABLE SEMI-PERMANENT MAGNETIC MEMORY

Filed Nov. 23, 1962 11 Sheets-Sheet 11

INVENTOR.
JOHN G. VALASSIS
BY C. A. Gulbrandsen
ATTY.

United States Patent Office 3,308,447 Patented Mar. 7, 1967

3,308,447

ELECTRICALLY ALTERABLE SEMI-PERMANENT MAGNETIC MEMORY

John G. Valassis, Chicago, Ill., assignor to Automatic Electric Laboratories, Inc., Northlake, Ill., a corporation of Delaware Filed Nov. 23, 1962, Ser. No. 239,555
5 Claims. (Cl. 340—174)

This invention relates to memory systems and in particular to electrically alterable memory systems.

The use of magnetic storage devices, such as ferrite cores and magnetic wires, is well known in the art. Such devices generally have a substantially rectangular hysteresis characteristic and the stored information often represents the binary memory system digits ONE and ZERO, each corresponding to one or the other of the magnetic remanent states described by the hysteresis characteristic.

J. T. Perry and K. E. Krylow, in their copending application Serial No. 132,079, filed August 17, 1961 (now abandoned), and assigned to the same assignee as the present invention, disclose a semi-permanent mechanically alterable non-destructive read-out magnetic memory system employing a coded card which is flux linked with a solenoid and a length of magnetic conductor. The presence or absence of openings in the coding card, along with the magnetic field produced by a coincident current write-in scheme, determines the magnetic remanent state at the bit locations. The information program is alterable by changing the coded card. This mechanical method of altering a program, while being tolerable for certain applications, is a relatively slow process and a great number of coded cards would be required for a given system to realize all possible program codes.

When the magnetic remanent state of a magnetic device is switched to the opposite remanent state during interrogation, the information represented by the first mentioned magnetic remanent state is destroyed and cannot be interrogated in the future. U. F. Gianola in his article "Non-Destructive Memory Employing a Domain Oriented Steel Wire," appearing in the May 1958 issue of the Journal of Applied Physics, describes a non-destructive read-out system in which a steel wire, under tension, is magnetized in the direction of stress by a write-in current pulse through a solenoid. Interrogation is performed by passing a sequence of current pulses down the wire and observing the electromotive force induced from the wire to the write-in solenoid which also serves as an output coil. Such a memory storage system would of course require special fabrication methods in order to provide the proper tension in the individual wires. The article, "Flux Lock—A Nondestructive, Random-Access Electrically Alterable, High-Speed Memory Technique Using Standard Ferrite Memory Cores," by R. M. Tillman, as published in the September 1960 issue of the IRE Transactions on Electronic Computers, describes a scheme for reversing the magnetic remanent state of a magnetic core. To switch the remanent state an information current is passed through a sense line and produces magnetic flux that is opposite to that of the existing magnetic state. A word solenoid is then repeatedly energized and deenergized by current pulses. During energization of the solenoid, the field produced thereby aids the existing remanent state in one part of the core and opposes that state in an opposite part of the core. Between pulses the flux density distribution around the core becomes uniform and the resulting action of the information current and the current pulses reduces the net core flux toward a demagnetized state. The above is repeated until the core is eventually placed in an opposite remanent state.

The fabrication of the memory of such a system, however, is relatively expensive compared to the memory used in the present invention.

The article, "Static Magnetic Storage and Delay Line," by Wang and Woo, published in the January 1950 issue of the Journal of Applied Physics, describes a system which employs a pair of magnetic cores for each bit of stored information and transfers that information from one core to the other as a form of non-destructive read-out. A similar arrangement is disclosed by E. G. Andrews in U.S. Patent 3,050,716. However, these arrangements require additional magnetic devices.

Modern computer type systems require memories which can be programmed and altered at a fast rate and which can be non-destructively interrogated. One system of this type is described in the article "An Electrically Alterable Non-destructive Twistor Memory," by R. L. Gray, in the December, 1960 publication of the IRE Transactions on Electronic Computers. According to that article a solenoid is used in conjunction with a coincident current write-in scheme to store information along a length of a magnetic conductor. A second solenoid, having a width that is relatively short compared to that of the first solenoid, is employed to interrogate a portion of the length of the magnetic conductor that was switched. The system requires additional solenoids and solenoid drivers. The present invention employs the same solenoids and solenoid drivers for both writing and reading the stored information.

The object of the present invention is to provide a novel and improved magnetic memory system.

Another object of the invention is to provide a magnetic memory system capable of indefinite interrogation.

Still another object of the invention is to provide a magnetic memory system in which the stored information can be electrically altered.

A feature of the invention is the use of a selectively controlled driver mechanism so that the same solenoid may be used for both write-in and read-out of stored information.

Another feature of the invention is the use of opposing voltages upon read-out, a signal to noise ratio that is essentially infinite.

In accordance with the principles of the invention, a length of "twistor" material, which may be a ribbon wound variation of the type described by A. H. Bobeck in the November 1957 issue of the Bell System Technical Journal, volume XXXVI, is located between a solenoid and a copper conducting area as described by Perry et al. in the above-mentioned copending application Serial No. 132,079. The copper area is not electrically connected to either the solenoid or to the twistor. The conducting area acts as a virtual solenoid, as disclosed in the just-mentioned application. According to the principle of the virtual solenoid, the conducting area is flux linked to the solenoid by the magnetic field that is established by a current flowing through said solenoid and effects an amplification of the magnetic field on the twistor between the solenoid and the conducting area. The amplification of the magnetic field is the result of eddy currents induced by the time varying flux linkages between the solenoid and the conducting area.

Other objects and features of the invention will become apparent from the following description and the accompanying drawings.

The following more detailed description is given in order to more fully understand the invention and its underlying principles.

Figures 1, 2:
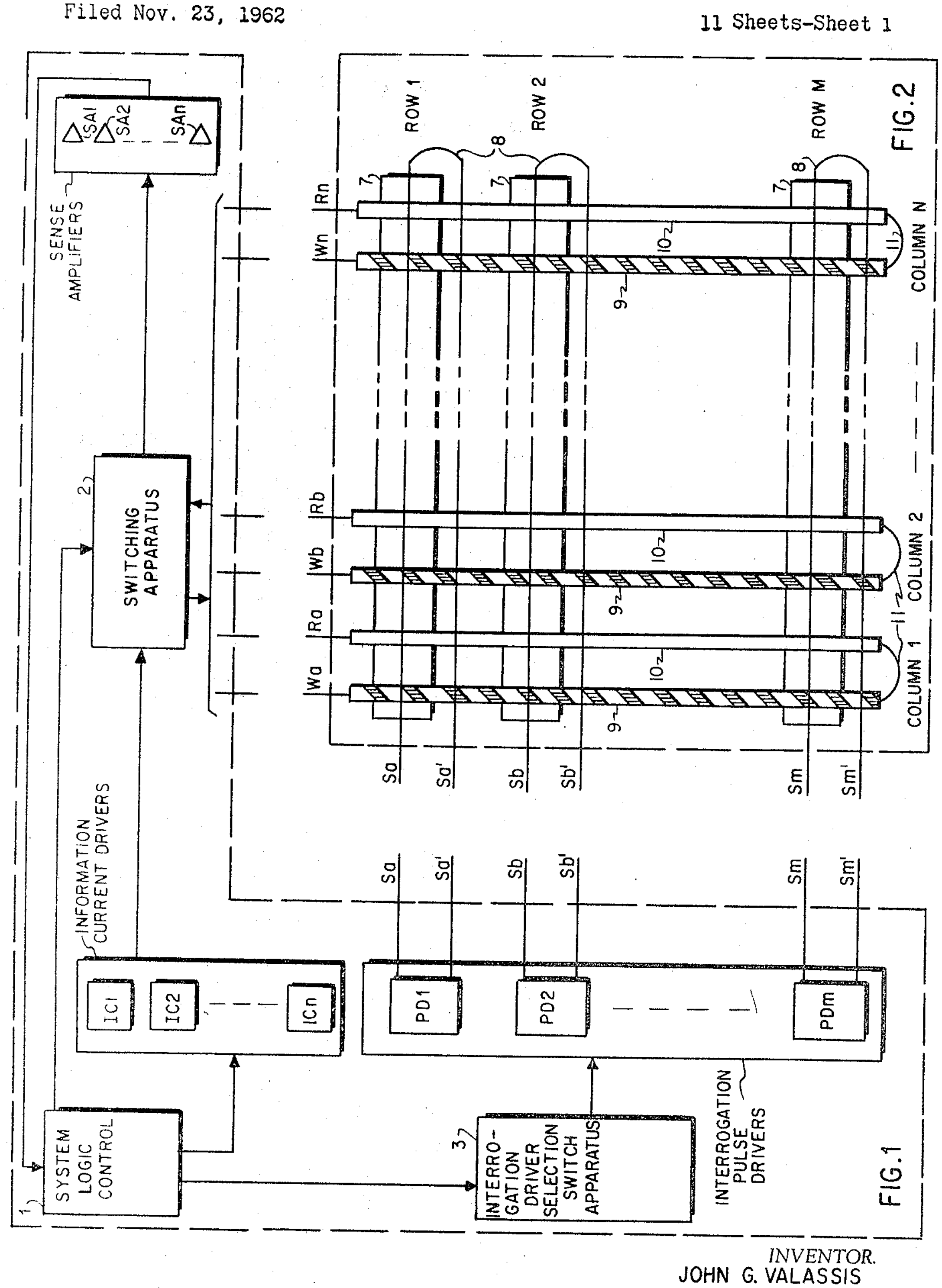
FIG. 1 is a schematic representation of program and interrogation apparatus in accordance with the principles of the invention.
FIG. 2 is a diagrammatic representation of a single-twistor-per-bit magnetic memory arrangement.

Referring to FIGS. 1 and 2, a memory system of M ROWS and N COLUMNS is shown employing magnetic wires or twistors 9 as the magnetic storage devices. Information is written into the bit locations of the twistors 9 by an orthogonal impulse switching write-in scheme involving an information current from the drivers IC1 to IC*n* of the switching apparatus 2 and the return conductors 10 in coincidence with the bipolar pulses from the interrogation pulse drivers PD1 to PD*m* by way of the driver selection apparatus 3 and the solenoids 8. Included within the dimension along the storage devices of the individual bit locations are the copper areas 7 which act as virtual solenoids for amplification of the magnetic fields produced by the pulses upon energizing the solenoids. The system logic control 1 controls the switching apparatus 2 and the pulse driver selection apparatus 3 for write-in and read-out. An order from the logic to write-in a word or a bit or to alter information of a word will cause the proper polarity of direct current from the proper information current driver or drivers to be applied to the magnetic device or devices corresponding to the selected twistor or twistors containing the selected bits by way of the switching apparatus 2 and will also cause the pulse driver selection apparatus to select the proper interrogation driver and its word solenoid to the corresponding selected word. To read-out a word, an order from the system logic 1 will cause the switching apparatus 2 to connect all magnetic storage devices to their respective sense amplifiers SA1 to SA*n* and will also cause the pulse driver selection apparatus to apply the pulses from the selected interrogation driver to its corresponding word solenoid.

From the above it should be noted that for writing both the solenoids and the storage devices are energized simultaneously, and for reading only the solenoids are energized.

Figure 3:
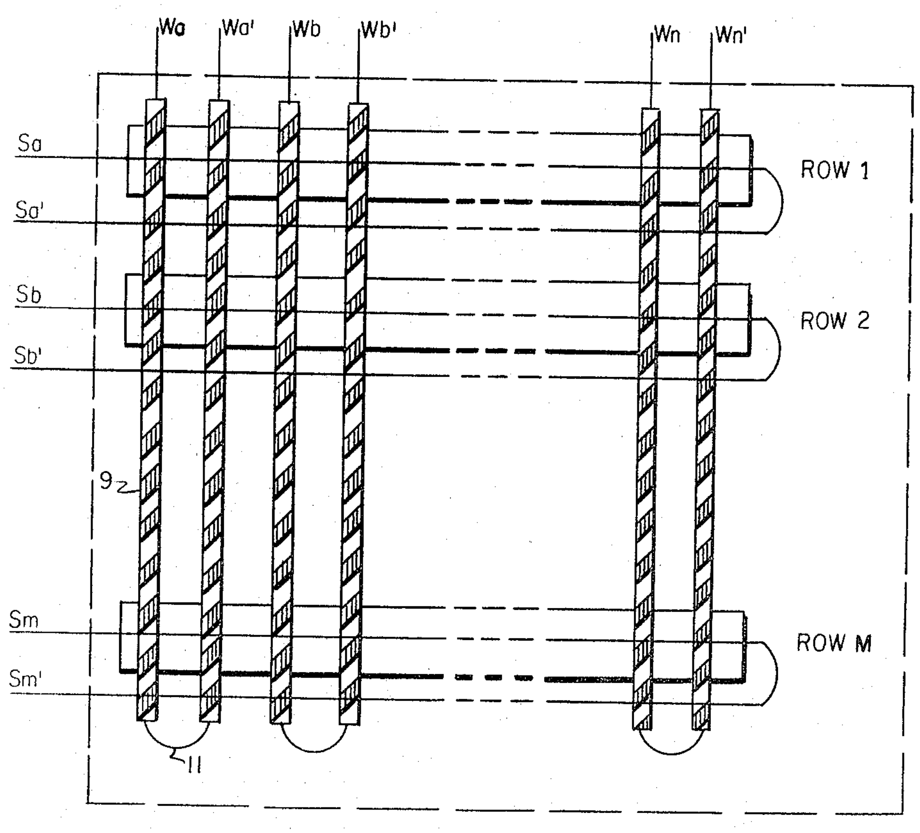
FIG. 3 is a diagrammatic representation of a double-twistor-per-bit magnetic memory arrangement.

Referring to FIG. 3 it can be seen that the magnetic memory arrangement is essentially the same as that shown in FIG. 2. However, the return conductors 10 of FIG. 2 have been replaced by additional twistor elements. The operation of the memory system of FIG. 3 is similar to that of FIG. 2. However, the bipolar output voltage sensed by the amplifiers will have an essentially infinite signal to noise ratio with respect to storage of a binary ONE and a binary ZERO since two storage locations are employed for each information bit.

Preferably, the system is oriented to write a word and read a word. However, individual bits may be written or read, depending on the specific logic control circuits. It should be noted that the memory can be accessed randomly or sequentially, depending on the type of logic control circuits.

FIGS. 4–9 are illustrations of memory arrangements employing printed circuit solenoids and wrap-around solenoids. According to the invention, a single solenoid is used for both write-in and non-destructive read-out. In FIGS. 4–9 it can be seen that the different figures can each be substituted for FIG. 2 to be compatible with FIG. 1, reference in this respect being made to the connections *Sa*–*Sa'* to S*m*–S*m'*, and W*a*–R*a* to W*n*–R*n* or W*a*–W*a'* to W*n*–W*n'*. However, only three columns have been shown in FIGS. 4–9. The same, of course, is true for FIG. 3.

Figure 10:
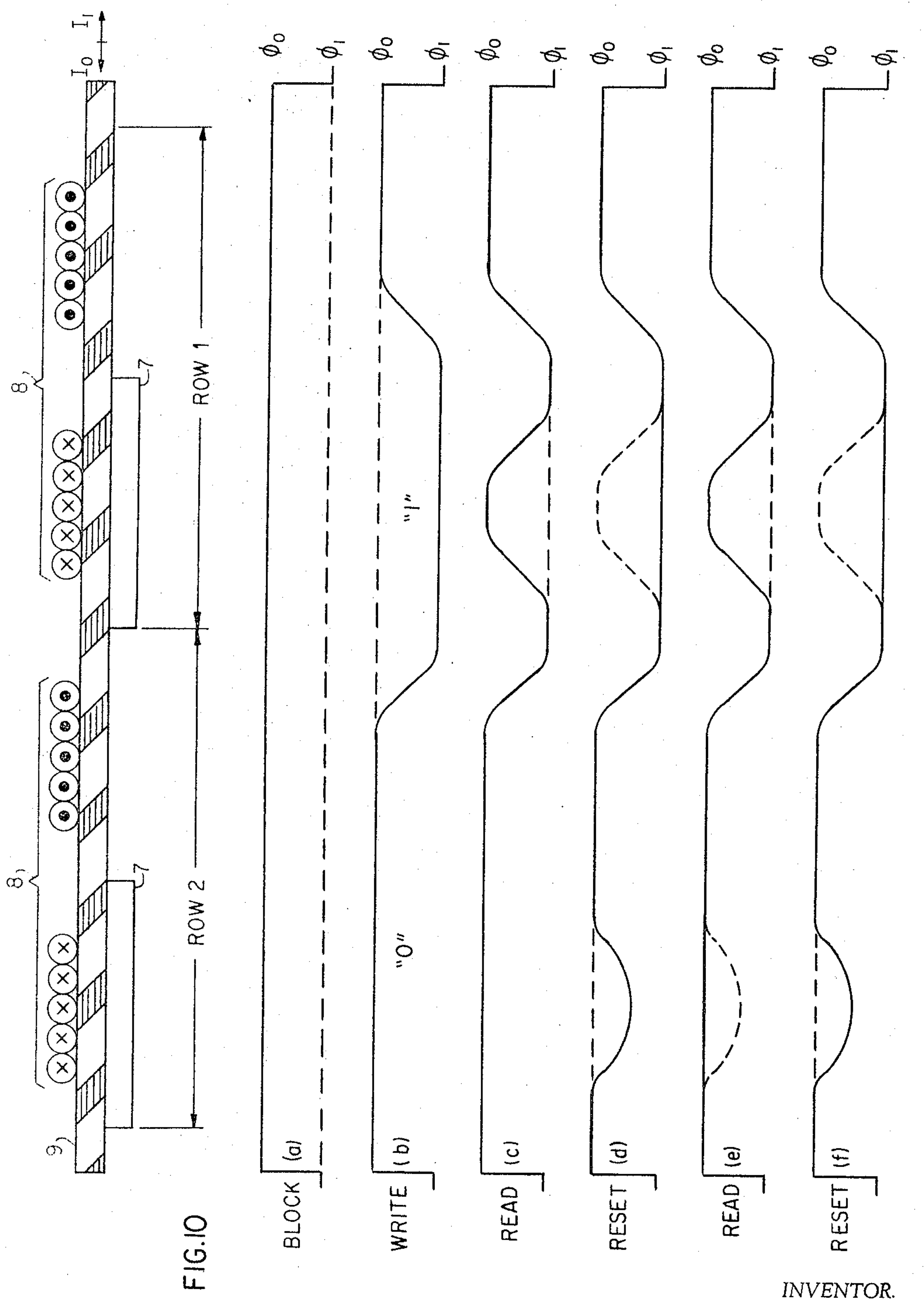
FIG. 10 is a representation of a length of magnetic conductor and the magnetic flux distribution along that conductor with respect to two opposite magnetic remanent states.

Referring to FIG. 10, one of the twistors 9, two of the word solenoids 8, and two of the copper conductive areas 7 have been extracted from FIG. 2 in order to explain the novel write-in process and the non-destructive read-out process. FIG. 10 also includes magnetic flux distribution diagrams corresponding to the bit locations of the twistor when one of these bits is storing a ONE and the other is storing a ZERO. FIG. 10 also shows the effect the read and reset pulses have on the flux distribution of a stored ONE and a stored ZERO.

Figure 11:
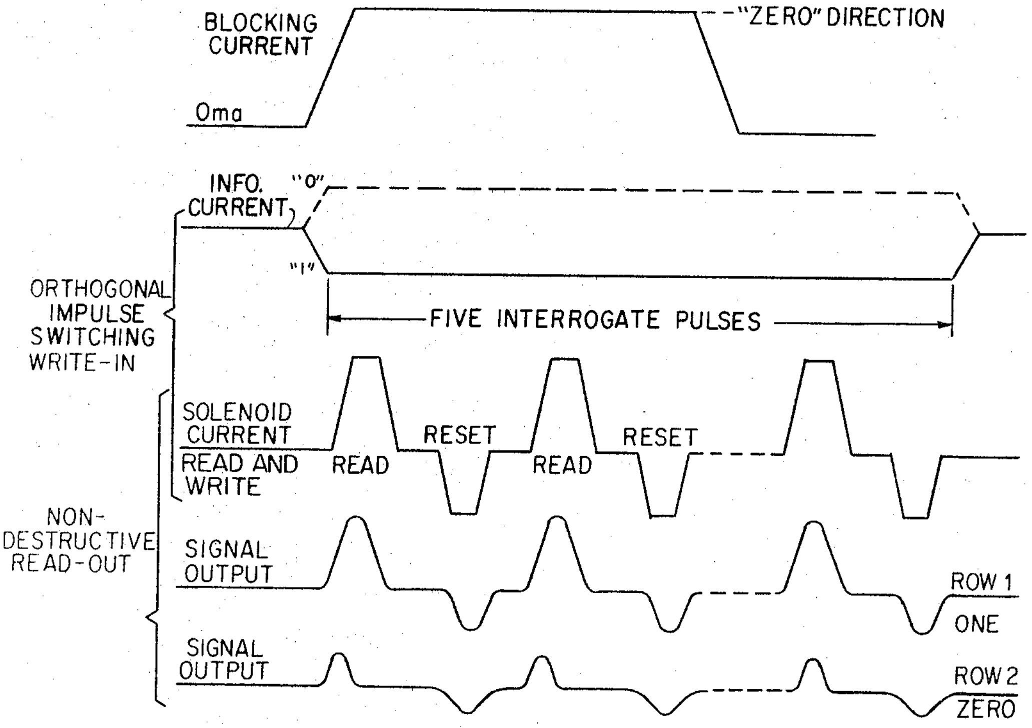
FIG. 11 is a combined pulse and timing diagram to further explain the write-in and read-out of information with respect to FIG. 10.

FIG. 11 is a graphical illustration of the various signals of the present invention. A blocking current provides a reference magnetic state for the magnetic devices, the ZERO state in this particular example. The orthogonal impulse writing technique is illustrated by the information current signal in conjunction with the solenoid current signal. Also shown are the output signals which result from the application of the solenoid read and reset signals during interrogation. The information and solenoid signals provide the writing flux conditions of FIG. 10 and the solenoid signals provide the flux excursions shown in FIG. 10 during interrogation.

Figure 12:
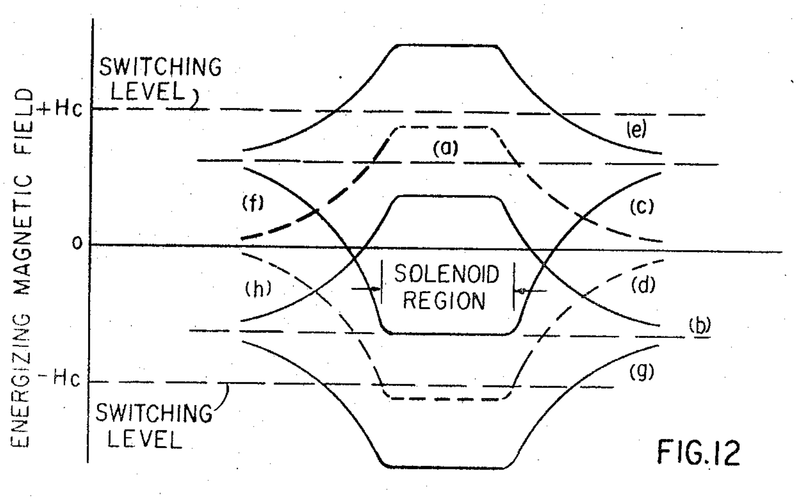
FIG. 12 is a group of curves showing the energizing field distribution to insert information electrically and extract information non-destructively from a magnetic conductor.

FIG. 12 is a graphical illustration relating the magnitudes of magnetic field intensity to the coercive force of the magnetic storage devices. These magnetic intensities are further explained below; however, it should be pointed out that the broken-line traces represent the magnetic intensity due to individual signals and solid line traces represent magnetic intensity due to a combination of individual signals.

FIGS. 11 through 15 relate to the flux distribution conditions shown in FIG. 10 and will be discussed below as they pertain thereto.

Figure 16:
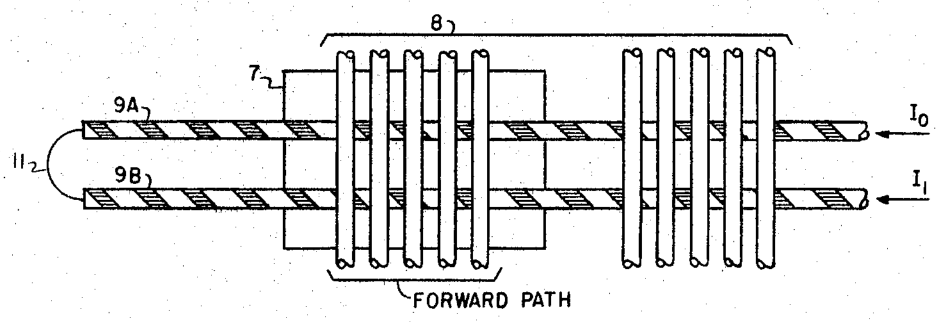
FIG. 16 is a schematic representation of a double-twistor-per-bit magnetic memory system in accordance with the principles of the invention showing the magnetic flux state distribution to insert information electrically and extract information non-destructively.
Figure 16:
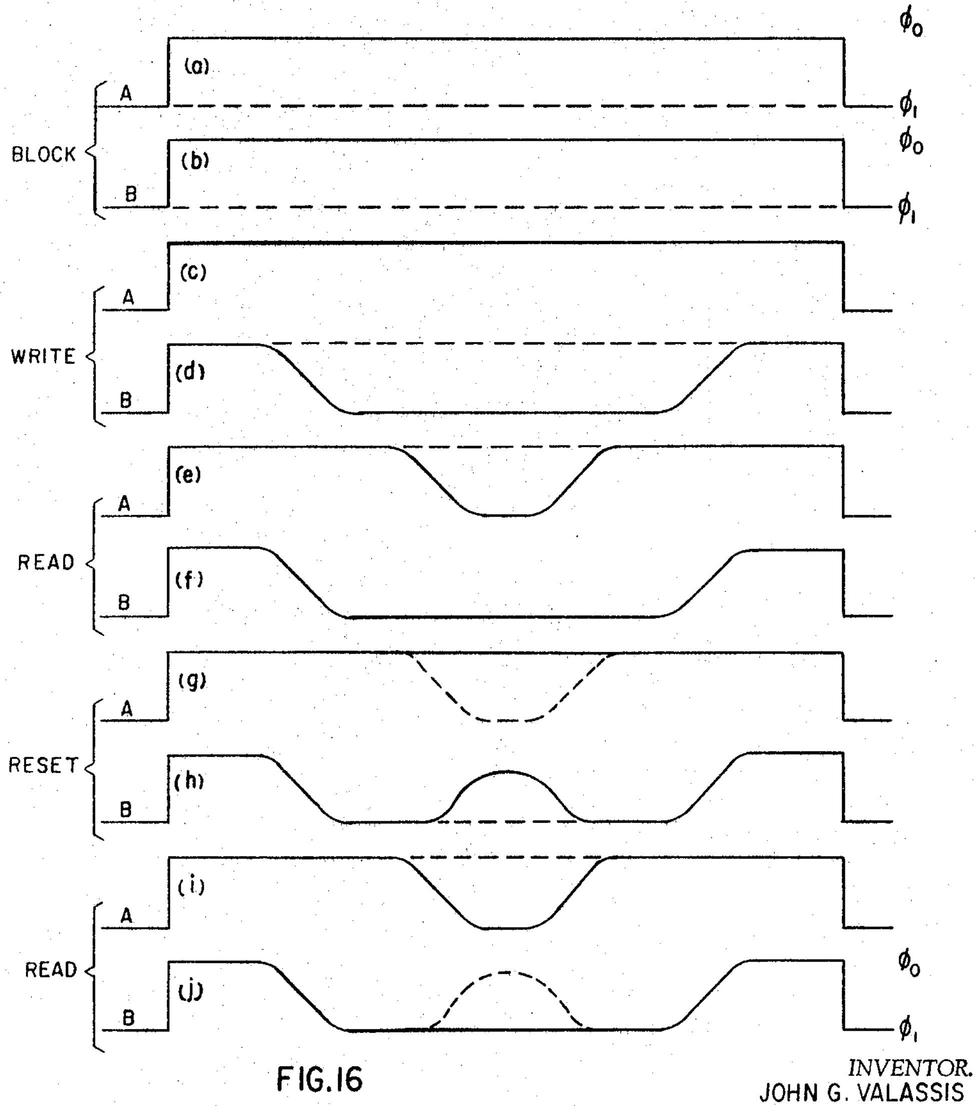

Referring to FIG. 16, two twistors 9, a conductive area 7 and a word solenoid 8 have been taken from FIG. 3 to describe the principles of the double-twistor-per-bit information storage process. The twistors 9 have been additionally labelled with the characters A and B in order to give a clearer explanation of the storage process. The magnetic flux distribution for a bit location is shown along with the variations of the flux during write-in and read-out. The bit location and flux distribution shown in FIG. 16 is very similar to that shown in FIG. 10, there being, however, two twistor portions per information bit, and as will be evident from the later discussion of FIG. 16, an addition of output signals due to simultaneous flux excursions in said two portions.

Figure 17:
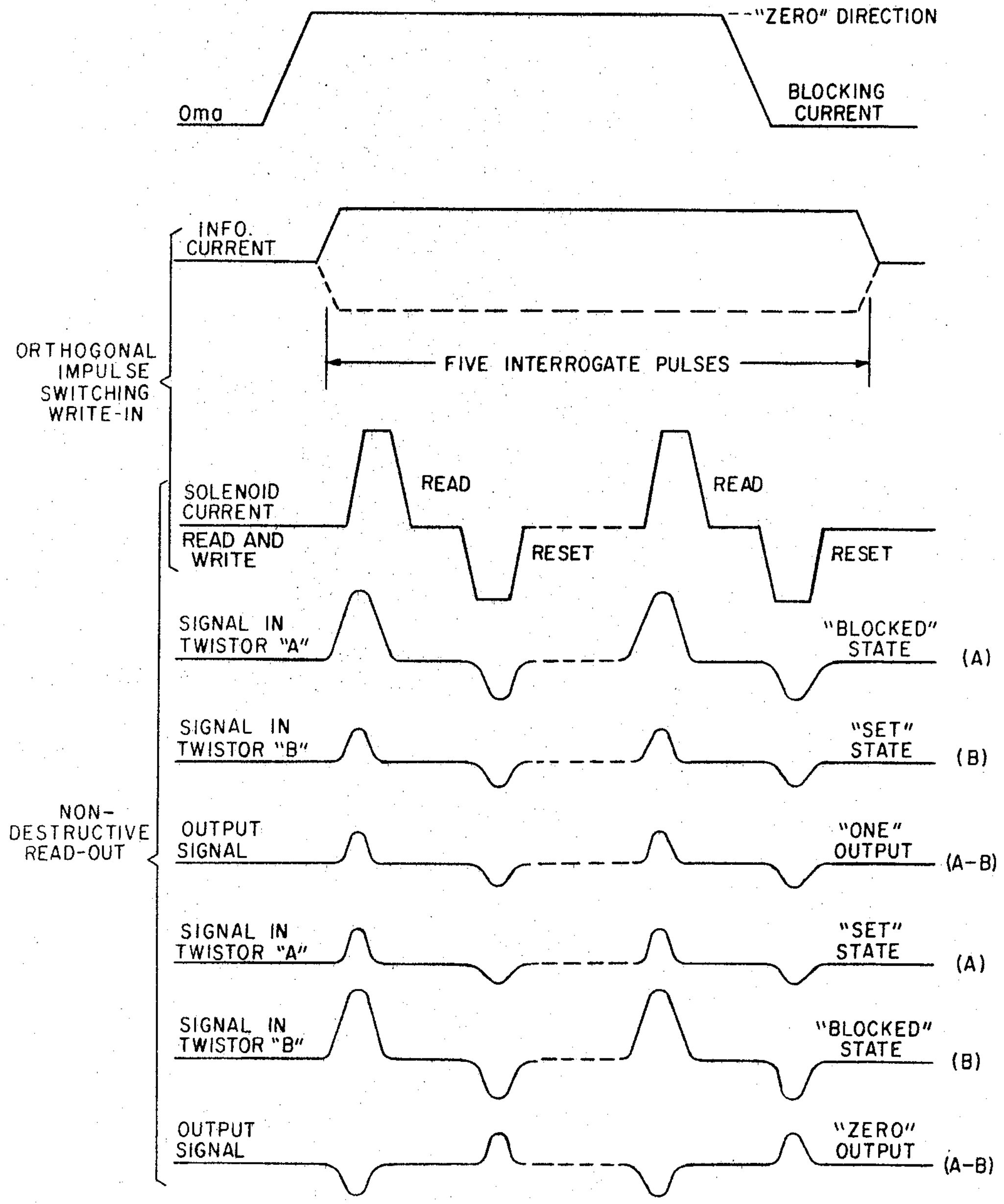
FIG. 17 is a combined pulse and timing diagram to explain the magnetic state switching for electrical write-in and non-destructive read-out of the memory system described in FIG. 16.

FIG. 17 is a combined pulse and timing diagram to aid in the explanation of FIG. 16. FIGS. 12 through 15 are also given to aid in the explanation of FIG. 16. FIG. 17 relates the information and solenoid signals to the flux conditions of FIG. 16, and relates the solenoid signals and output signals to the flux excursions of FIG. 16. FIG. 17, therefore, relates signals to FIG. 16 for the double-twistor-per-bit arrangement as FIG. 11 relates similar signals to FIG. 10 for the single-twistor-per-bit arrangement.

In the following description, for convenience of reference, it will be assumed that the complete memory is blocked in the ZERO state.

Referring to FIGS. 1 and 2, assume that the magnetic storage devices 9 have been previously conditioned to a magnetic remanent state representing a binary ZERO by the blocking current shown in FIG. 11. For purpose of illustration, also assume that the system logic 1 has ordered that a word be written in ROW 1 and that in ROW 1 a ONE is to be stored in the bit location of ROW 1, COLUMN 2. Being specific to the bit at ROW 1, COLUMN 2, an order from the logic circuits causes the driver IC2 to be connected by way of switching apparatus 2 to the magnetic device 9 of COLUMN 2 and its corresponding return conductor 10 so that in this example a current $I_1$ representing a ONE is caused to traverse the magnetic device and return conductor in the direction shown in FIG. 10. The order from the system logic 1 also causes the driver selection apparatus 3 to select the driver corresponding to ROW 1 to energize that solenoid 8.

Referring now to FIGS. 10 and 11, assume that the magnetic device 9 is the magnetic device of COLUMN 2 and that the solenoids 8 represent ROW 2 and ROW 1, respectively, from left to right. As shown in FIG. 10, the information current is flowing in a direction through the center conductor of the magnetic device from left to right creating a circular magnetic field (not shown) around the magnetic device that is coming out of the drawing above the magnetic device and entering the drawing below the magnetic device. This information current is shown as the negative information current trace in FIG. 11 and will last under the control of the logic 1, for a definite number of repetitions, say five sets of the interrogation pulses. Immediately below the information current trace is a trace of the solenoid current showing positive read pulses and negative reset pulses. The magnetic fields established by the read and reset current pulses are indicated on FIG. 10 by the assumed positive direction of current flow through the ROW 1 solenoid and will be clockwise around the solenoid for the positive read current pulses and counterclockwise for the negative reset pulses. It can be seen that the magnetic field established by the information current and by the interrogation pulses are substantially orthogonal. The copper conductive area 7 located directly below the positive current direction conductor of the solenoids 8 acts as a virtual solenoid to amplify the magnetic field established by the pulses, as previously described. The summation of the information current field and the interrogation current field will progressively switch a portion of the magnetic conductor of the magnetic storage device from a magnetic remanent state caused by the blocking current, represented in FIG. 10 by $\phi_0$ to that represented by $\phi_1$, for a length, along the device that is greater than the width of the copper conductive area. This progressive switching action can be seen in still greater detail by referring to FIGS. 13, 14 and 15.

Figure 13:
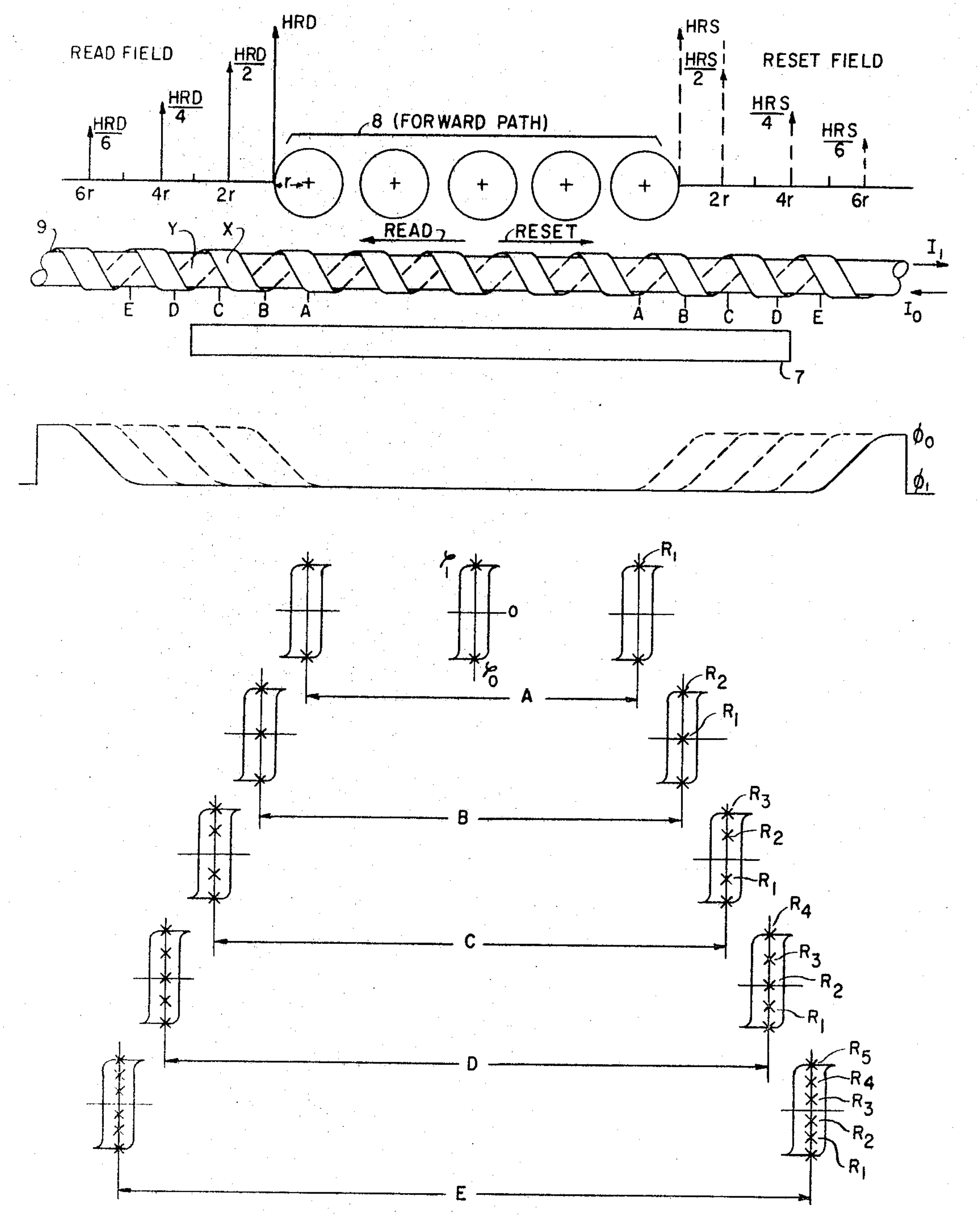
FIG. 13 is a diagram of the progressive magnetic flux reversal along a length of magnetic conductor during the orthogonal impulse switching write-in showing hysteresis characteristics for individual portions along the magnetic conductor.
Figure 14:
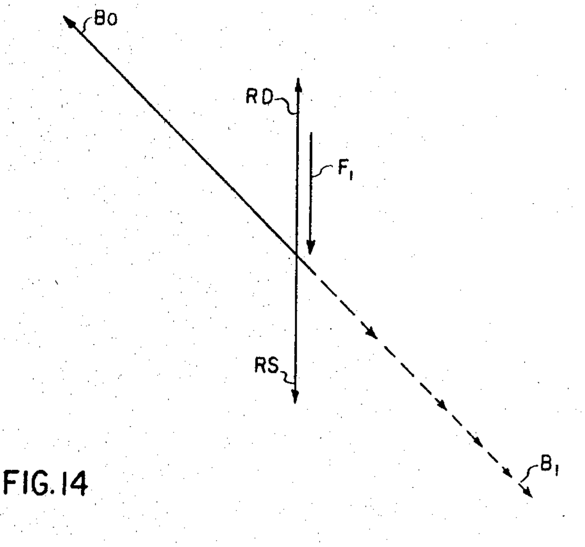
FIGS. 14 and 15 are vector diagrams showing the orthogonal impulse switching write-in scheme in accordance with the principles of the invention.
Figure 15:
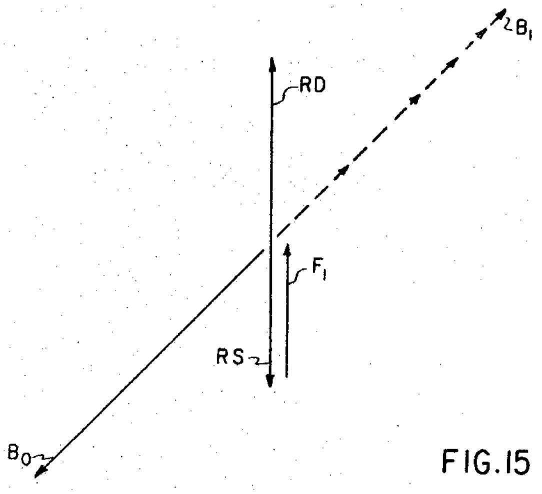

In the just-mentioned figures, it can be seen that for the forward current path of the solenoid 8 that the read pulse field is clockwise and the reset pulse field is counterclockwise. Still assuming that a ONE is to be written in this particular bit location, the information current is through the center conductor of the magnetic device in a direction from left to right producing a field on the front side of the drawing that is in a generally downward direction and behind the drawing in a generally upward direction. The vectors of FIGS. 14 and 15 are only descriptive of the switching action in extended portions A–E as shown in FIG. 13 and do not indicate the switching action directly below solenoids 8. The vectors shown in FIGS. 14 and 15 are not necessarily drawn to scale.

In regions, such as the region A–E including the portion designated X (FIG. 13) on the front side of the magnetic device, and referring to FIG. 14, the vector $B_0$ is representative of the blocked or ZERO storing state of the magnetic conductor and vector $B_1$, of the "set" or unblocked state, these vectors being oriented at approximately 45° to physically correspond to the easy axis of the twistor as described by Bobeck above. The vector RD represents the field produced by one read current pulse and the vector $F_1$ represents the field produced by the information current to write a ONE. It can be seen that the direction of the RD and $F_1$ fields are opposite and the fields tend to cancel. The vector RS represents the field produced by the reset current pulse which is generally opposed to the vector $B_0$. In FIG. 14 it can easily be seen that fields RS and $F_1$ are additive to switch portions of $B_0$, that is small segments such as X, each time pulse RS occurs, and that the next occurring pulse RD will have no adverse effect on such switching since RD and $F_1$ are opposed.

Only the field produced by one current pulse is shown for the read field because of the cancelling effect of RD and F. However, the five relative remanent states at the termination of each of the five reset pulses are shown to better explain how the progressive switching action occurs along the front side of the magnetic device. The addition of the fields produced by the reset current pulses and the information current have components that are directly opposed to the field $B_0$ and add to switch the direction of field $B_0$ 180° to form vector $B_1$ which defines the resultant magnetic condition of a length of twistor which is substantially greater than the width of the solenoid. FIG. 13 shows this incremental switching in the form of flux gradients between $\phi_0$ and $\phi_1$. A similar situation can be seen for the region on the back (dotted line) side of the magnetic device, such as the portion designated Y in FIG. 13 as described in FIG. 15. However, on the back side it is the reset field RS and the information current field $F_1$ which are opposed and tend to cancel and the addition of the read current field RD and the information current field $F_1$ which tends to switch the direction of the vector $B_0$ to that of $B_1$. It should be noted that as the domains align in the requested direction, they are acting as permanent magnets of increasing size which also helps to switch the state of the bit location. The minute portions of the magnetic conductor intermediate to such portions as X and Y have the magnetic state change due to the attractive forces of the increasing magnetic domain alignment.

Referring to FIG. 12, it can be seen from trace *a* that the information current is chosen such that the produced M.M.F. is slightly less than the coercive force Hc of the magnetic conductor. This is necessary to maintain the field produced by the information current to a level that is below the switching threshold in order to avoid pulse flux reversal in other words in the memory. Traces *a* and *b* of FIG. 12 represent the fields set up by the information current for storing a ONE and a ZERO, respectively. Trace *c* represents the field distribution produced by the reset current pulse. It is to be understood that the trace *c* represents only the magnitude of that field and not its direction, which changes from a horizontal orientation beneath the solenoid region to an upward vertical orientation on the right side of the solenoid, as can be seen in FIG. 13, to a downward vertical orientation on the left side of the solenoid. Trace *d* represents a similar situation for the magnetic field produced by the read current pulse. Trace *e* shows the combined reset field (trace *a* plus trace *c*) to write a ONE and trace *f* shows the combined read field (trace *a* plus trace *d*) to write a ZERO, as previously described in FIGS. 14 and 15. To write-in a ONE the coincidence of the polarized information current and the reset current pulse will produce the combined field distribution of trace *e*. Underneath the solenoids this field exceeds the switching level shown in FIG. 12 and hence this region is being placed in the unblocked or "set" state. Therefore, flux reversal beneath the solenoid is achieved by the same principle as that of a coincident current scheme in a destructive read-out twistor memory. Regions extending beyond the two ends of the solenoid, which determine the type of information stored in each bit, are being set according to the orthogonal impulse switching mechanism.

Referring to FIG. 13, and considering a region to the left of the solenoid, it can be seen that the field produced by the read current pulse is aiding the field produced by the information current, thus partially setting twister portions drawn by the dotted lines such as Y. Twistor portions, drawn by the solid lines, such as X, are not set because the read field opposes that of the information current field. Similarly, in regions to the right of the solenoid only portions of the twistors drawn by the solid lines are set. However, the field produced by the reset pulse, which is opposite to that produced by the read pulse, will set the blocked magnetic device portions. Therefore, at the termination of the first set of interrogation current pulses, twistor regions at the two ends of the solenoid will be partially placed in the unblocked or set state.

Still referring to FIG. 13, the individual hysteresis loops have been drawn to represent twistor regions to the left and to the right of the solenoid. In each hysteresis loop, the remanent state of magnetization of each region at the termination of each set of interrogation pulses is shown. For example, at the ends of the first set of interrogation pulses the twistor region A—A is placed in the set state. As regions B to E, on either side of the solenoid, the application of the first set of interrogation pulses only partially switches the twistor due to the exponential attenuation of the solenoid fields which is shown in FIG. 13 by the solenoid conductor radius-field strength relation. The variation in flux set at different regions along the twistor due to the variation in magnitude of the orthogonal field is also shown in FIG. 13. The amount of flux set is represented by different remanent states designated $R_1$ to $R_5$ on the individual hysteresis loops. Comparison between the hysteresis loop of section B and section D shows that in section B 50% of the flux is set, while in D only 25% is set. The second set of interrogation pulses switches an additional amount of flux and the new remanent state is designated $R_2$. Following the same switching process, at the termination of five sets of interrogation pulses, the entire region E—E is placed in the set state. The progressive flux reversal along the magnetic conductor during the orthogonal impulse switching write-in is shown in FIG. 13 by the progressive steps from $\phi_0$ to $\phi_1$ and the individual hysteresis loops.

The previous discussion was directed to the write-in of of a ONE, that is, reversing the remanent state from a blocked state indicating a ZERO to that indicating a ONE. These original and final states were picked arbitrarily. The same scheme can be used to change the state of the twistor elements from the set state to the blocked state. Referring to FIG. 12 trace *g* shows the combined read field (trace *b* plus trace *d*) to write a ZERO and trace *h* shows the combined reset field (trace *b* plus trace *c*) to write a ZERO. The progressive switching action to write a ZERO or alter the information from a state storing a ONE to that storing a ZERO is similar to that just described for writing a ONE; however, the direction of the information current is reversed, which would reverse the roles of the fields RD and RS in FIGS. 14 and 15. Also, the blocking current may be reversed so that after blocking, the magnetic memory will store all ONES, as a reference state. Then, selectively, bits in the memory are written in with ZEROS using the same orthogonal impulse switching write-in scheme. Where the blocking current first blocks all elements to a state representing a ZERO, as was the case for the description of the ONE write-in, an information current to write a ZERO will establish a magnetic field which will only force the magnetic remanent state of the bit location further into the block state. The converse is true for a memory blocked in a ONE state and an information current representing a ONE.

After the magnetic memory has been programmed, altering the information in individual words does not require clearing of all the bits in the word to a reference state, either blocked or set. Instead, the system logic 1 controls the individual information current drivers to provide the proper polarity information currents, which persist for a time sufficient so that a predetermined number of sets, say five, of interrogation pulses traverse the solenoid of the word having the bit or bits to be altered.

Referring again to FIGS. 1, 2, 10 and 11, assume that the entire memory has been programmed and that the system logic 1 orders that the word indicated by ROW 1 is to be read. The order to read-out a word causes the switching apparatus 2 to connect the magnetic device 9 and their return conductors 10 to the corresponding sense amplifiers SA*l* to SA*n* and also causes the interrogation driver selection apparatus 3 to select the interrogation driver for the solenoid 8 of ROW 1. The interrogation pulses, as shown in FIG. 11, are then applied to the ROW 1 solenoid. Referring to FIG. 10, if the bit locations are in the set or store ONE state, considerably more flux is switched irreversibly during interrogation than if a bit location is in the blocked or store ZERO state. This can be seen in traces *c* to *f* of FIG. 10.

Referring to the portions of the individual traces corresponding to a ONE being stored, the read pulse produces a field that tends to block or reverse the remanent state of the magnetic device. Although the magnitude of the pulse is strong enough to switch the twistor to the blocked state in the area of the solenoid, the magnetizing forces at the ends of the solenoid prevent switching of the magnetic device in all regions except at the center of the solenoid. The post-read state of the flux in the magnetic device is represented by the solid lines of traces *c* and *e*. The next reset pulse resets the bit to its set or store ONE state. Since the demagnetizing forces are aiding the reset pulse, a smaller reset current pulse must be used to completely reset all of the flux that was switched to the blocked state by the read pulse. Referring to the portions of the curves showing a store ZERO state, it can be seen that the read pulse produces a field that tends to further block the bit location.

A comparison of the flux switched irreversibly by the read pulse for the store ZERO and store ONE states, respectively, shows that the flux switched in the store ONE state is greater than that in the store ZERO state. Therefore, the output signal obtained from the store ONE state will be greater than that of the output signal obtained from the store ZERO state, as shown in FIG. 11. These induced voltages are sensed by the amplifiers and can be utilized by external circuitry sent to the system logic, as shown in FIG. 1, to perform certain logic functions.

Referring now to FIGS. 1, 3, 16 and 17, and keeping in mind FIGS. 12, 14 and 15, it can be seen that the magnetic memory system shown by the combination of FIGS. 1 and 3 is similar to that of FIGS. 1 and 2. However, the return conductors 10 of FIG. 2 have been replaced by twistors 9. Assuming that all the twistors 9 in this double-twistor-per-bit arrangement have been blocked in the same direction, as were the magnetic devices in FIG. 2, it is evident that a direct current flowing through a series connected pair will establish magnetic fields around each device that are of opposite sense. Taking the situation as previously described, that is a word is to be written in ROW 1 and that the bit location ROW 1, COLUMN 2, is to store a ONE, the system logic 1 orders the proper polarity from the information current driver 5, among which is IC2; orders the switching apparatus 2 to connect those currents to the corresponding pairs of magnetic elements which form separate columns; and orders the interrogation driver selection apparatus 3 to select the interrogation pulse driver PD1 and its corresponding solenoid 8 of ROW 1. Referring now to FIG. 16, assume that the solenoid 8 is the solenoid for ROW 1 and that the two twistors 9 are those of COLUMN 2. Traces *a* and *b* of FIG. 16 show that both magnetic devices are blocked to the state $\phi_0$ representing the storage of a ZERO, as a reference state for the magnetic devices.

To write a ONE, the coincidence of the polarized information current and the reset current pulse will produce the combined field distribution of trace *e* of FIG. 12, similar to that previously described for the single-twistor-per-bit arrangement. Beneath the solenoid 8 the field exceeds the switching level, and hence, this region is being placed in the store ONE state. Therefore, flux reversal beneath the solenoid is achieved by the same principle as that of a coincident current scheme in a destructive read-out twistor memory system. Regions extending beyond the two ends of the solenoid, which determine the type of information stored in each bit, are being set according to the orthogonal impulse switching mechanism.

It can be seen in FIGS. 16 and 17, that if the information current is in a direction as to pass in a positive sense through twistor 9A and then by way of electrical connection 11 in a negative sense through 9B, that twistor 9B, under the influence of the coincidence of this information current and the pulses of the interrogation driver as did the device just discussed for the single-twistor-per-bit arrangement. It will be set in an opposite state to that of twistor 9A. However, there are now two center conductors connected in series, which upon interrogation will each have a voltage induced in a direction opposite to the other. The result of these two opposite polarity voltages in series will effect either a positive or a negative output signal, which in essence provides an infinite signal-to-noise ratio for detection by the sense amplifiers. The write-in process is very similar to that for the single-twistor-per-bit arrangement. The traces for the separate write, read and reset operations are shown in FIG. 16. By the fact that the magnetic devices 9A and 9B are connected in series, it can be seen from the previous description of the single-twistor-per-bit arrangement that when one magnetic device is placed in a remanent state, say $\phi_0$, that the other magnetic device is placed in the opposite remanant state, $\phi_1$.

Referring to FIGS. 1, 3 and 16, when a word, say ROW 1, is to be interrogated, the system logic 1 so informs the interrogation driver selection apparatus 3, which in turn selects the proper interrogation pulse driver and its corresponding solenoid 8. The system logic 1 also informs the switching apparatus 2 to connect the magnetic devices to the sense amplifiers. The interrogation process is also similar to that described for the single-twistor-per-bit arrangement; however, the magnetic field produced by the read pulse and the reset pulse effects both of the magnetic devices 9A and 9B of each column. Referring to traces *e* to *j*, with the magnetic device being in the set state (trace *e*), very little flux is switched irreversibly during interrogation, as can be seen in traces *h* and *j*. The reset pulse produces a field that tends to block the bit location of the magnetic conductor. However, the demagnetizing forces at the ends of the solenoid, plus the fact that the reset pulse is chosen to be smaller than the read pulse, only a small portion of the twistor is partially blocked. The next pulse returns all the flux back to the set state, but since the available switched flux is small, a small output signal is obtained.

The magnetic flux state distribution during interrogation of the double-twistor-per-bit arrangement is shown in FIG. 16, twistor 9A is placed in the blocked state while twistor 9B is placed in the set state. Comparison of the flux switched irreversibly by the read pulse in devices 9A and 9B, respectively (traces *i* and *j*), shows that the flux switched in device 9A is much greater than that switched in device 9B. Therefore, the voltage induced in the inner conductor of device 9A is greater than that which is induced in the inner conductor of device 9B. The output voltage, which is the difference between the individual voltages induced, will be in phase with the voltage induced in the center conductor of device 9A.

The output voltage obtained upon interrogation when twistor 9A is in the blocked state while twistor 9B is in the set state will be, for example, the ONE output. From the above explanation, it can be seen that if twistor 9B is maintained in the blocked state while twistor 9A is in the set state, flux set, irreversibly, by the read pulse in twistor 9B will be greater than that set in twistor 9A. Therefore, the voltage induced in the inner conductor of twistor 9B is greater than that induced in the inner conductor of twistor 9A. The output voltage, which is the difference between the voltages induced in twistors 9A and 9B, will be in phase with the voltage induced in twistor 9B and will similarly be the ZERO output. Both the ONE output and the ZERO output can be seen in FIG. 17.

From the previous discussion, it can be seen that the relative polarization of each magnetic device with respect to the other will determine the polarity of the output signal, and hence the information stored in the magnetic device.

Figure 4:
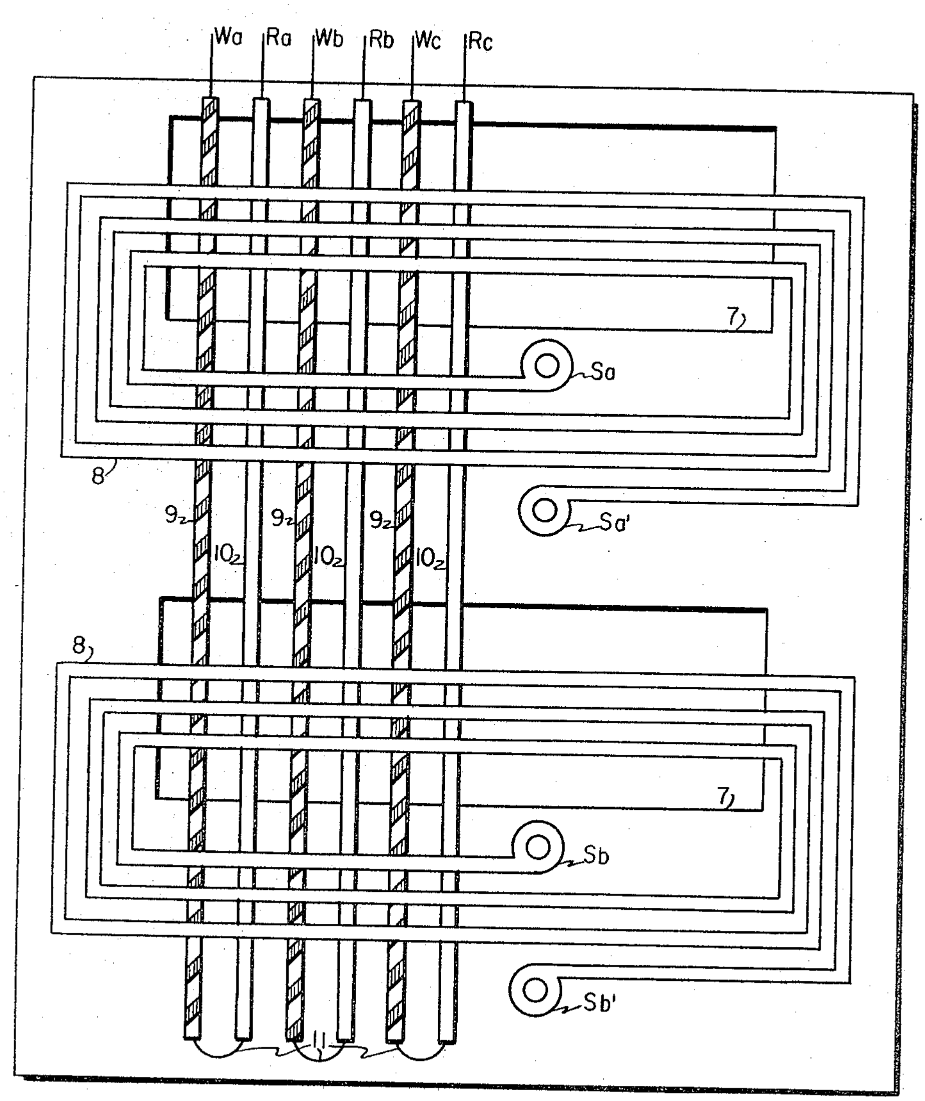
FIG. 4 is a representation of a single-twistor-per-bit magnetic memory arrangement employing printed circuit solenoids.

Referring now to FIG. 4, a single-twistor-per-bit arrangement is shown employing a plurality of twistors and a plurality of return conductors placed on a conductive sheet having a plurality of apertures therein. The areas between the apertures are the conducting areas 7 which act as virtual solenoids. Placed over the plurality of twistors and return conductors is a printed circuit solenoid arrangement having a plurality of solenoids 8.

Figure 5:
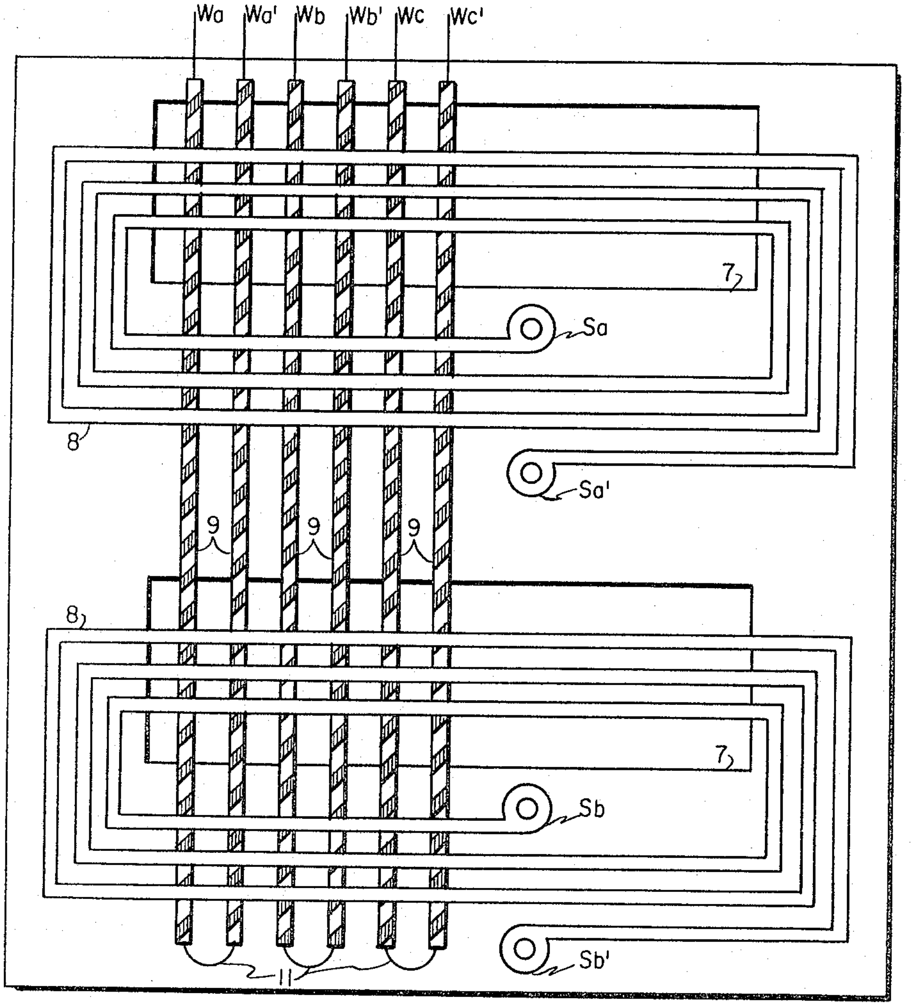
FIG. 5 is a representation of a double-twistor-per-bit magnetic memory arrangement employing printed circuit solenoids.
Figure 6:
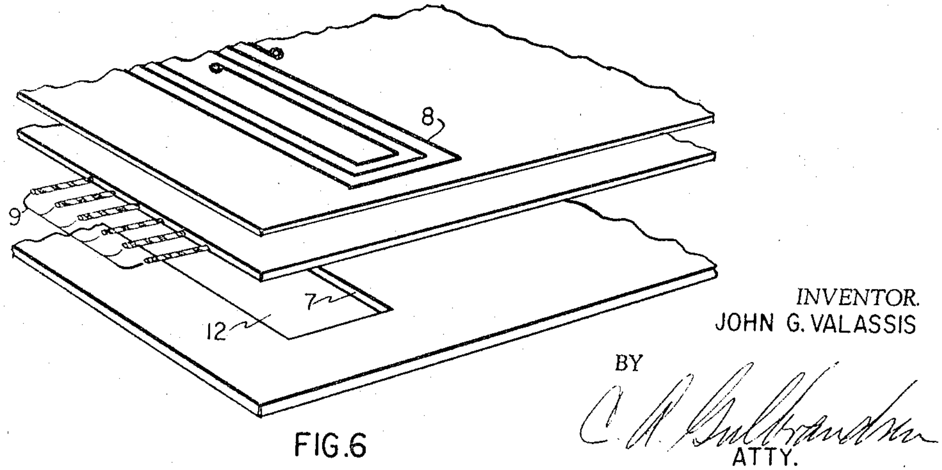
FIG. 6 is an exploded view of a portion of the printed circuit solenoid concept to better explain FIGS. 4 and 5.

Referring to FIGS. 5 and 6, a double-twistor-per-bit magnetic memory plane arrangement can be seen which is similar to the single-twistor-per-bit arrangement shown in FIG. 4. In FIGS. 4, 5 and 6, the plurality of twistors or twistors and return conductors may be a tape, that is, they may be in the form of a laminated plastic tape.

Figure 7:
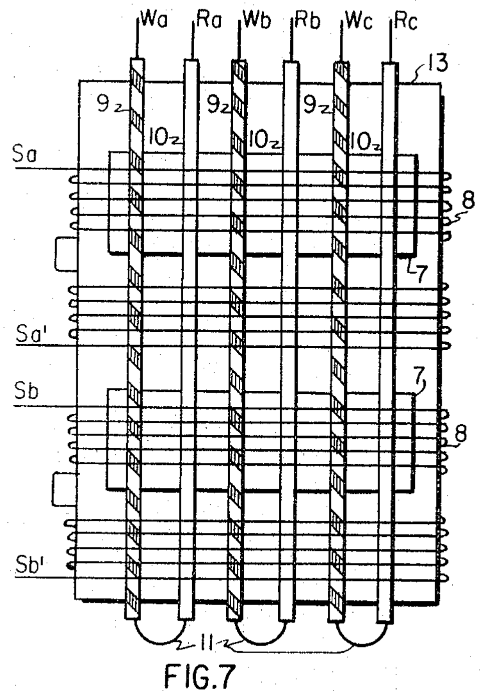
FIG. 7 is another representation of a magnetic storage arrangement employing racetrack wrap-around solenoids.

Referring to FIG. 7, a magnetic memory arrangement is shown employing racetrack wrap-around solenoids which are in accordance with the printed racetrack solenoids of FIGS. 4, 5 and 6. The interconnection of the two coils is made such that the energizing fields generated by the two coils are in phase opposition. The conductive areas 7 may be advantageously plated on a mounting card 13 and are used as previously described to amplify the fields set up by the interrogation current pulses. The presence of the conductive area opposite to one of the coils produces the uneven distribution in the amplitude of the energizing fields along the twistor. This is the necessary condition for operation of the twistor memory in either the destructive or non-destructive read-out mode.

Figure 8:
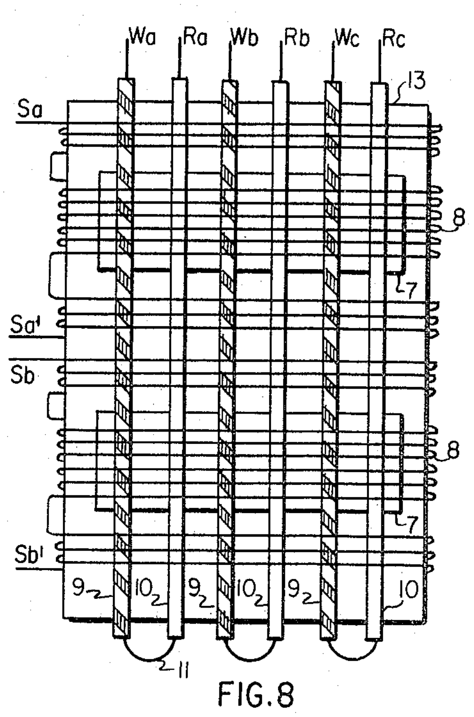
FIG. 8 is a representation of a magnetic memory arrangement employing loop wrap-around solenoids.

Referring to FIG. 8, another magnetic memory arrangement is shown similar to that of FIG. 7, which employs loop wrap-around solenoids. The interconnection of the three coils is made such that the energizing fields generated by the outside coils are in phase opposition with the energizing fields generated by the center coil. The presence of the conductive area opposite to the middle coil makes the uneven distribution in amplitude of the energizing fields along the twistor more pronounced.

This feature is desirable in that it improves the operation of the memory in either the destructive or non-destructive read-out mode.

Figure 9:
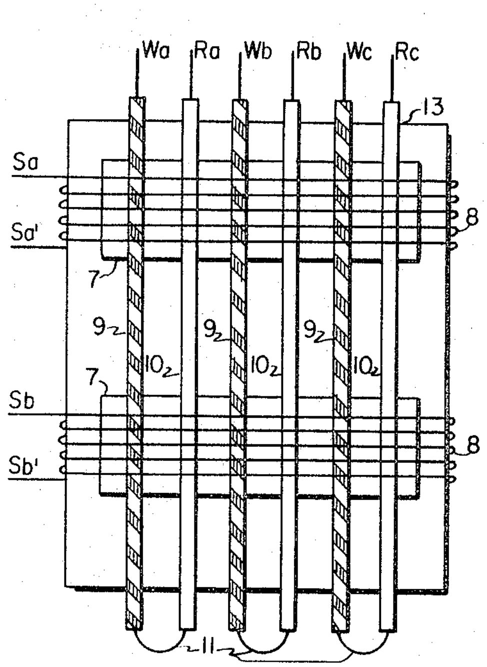
FIG. 9 is still another representation of a magnetic memory arrangement employing coil wrap-around solenoids.

Referring to FIG. 9, a memory plane arrangement is shown employing coil wrap-around solenoids. The conductive areas 7 are used as previously described.

Referring again to FIG. 7, it can be seen that any stray voltages, such as noise, which may be induced to the twistor by one direction of the coil winding will be compensated for by the voltage induced by the opposite direction winding. The same is true to a lesser degree for the loop wrap-around solenoid of FIG. 8.

By way of example, single-twistor-per-bit memory produced output voltages of 12 millivolts and 5 millivolts for a ONE and a ZERO, respectively. A double-twistor-per-bit magnetic storage arrangement has produced output voltages of +7 millivolts and −7 millivolts for a ONE and a ZERO, respectively. The coercive force Hc of the twistor element was approximately 4 oersteds. The information current used in a specific test for both the single-twistor-per-bit and double-twistor-per-bit arrangement was 40 milliamps. The read and reset current pulses were 500 milliamps and 400 milliamps, respectively and the period for one set of pulses was 3 microseconds; the duration of the information current being for the completion of 5 sets of interrogation pulses of 15 microseconds. The original blocking current used was 200 milliamps.

The invention disclosed herein has been shown in certain embodiments and with respect to specific values for purpose of illustration only. For example, conductive areas and twistors can be placed on both sides of the base cards of FIGS. 7, 8 and 9 to further decrease the overall size of the memory plane arrangements. Many modifications may be made by those skilled in the art and should be included in the appended claims.

What is claimed is:

1. An electrically alterable magnetic memory comprising elongated bistable magnetic storage means including a non-magnetic conductor and including a magnetic conductor helically disposed about said non-magnetic conductor and having a substantially rectangular hysteresis characteristic, and also comprising electrical conductor means extending adjacent and perpendicular to said storage means, a data bit location along said storage means substantially defined by the width of said electrical conductor means, first and second pulse sources, the pulses of said second source being short with respect to the pulses of said first source, and control means for coincidently applying a pulse from said first source and a series of pulses from said second source to said non-magnetic conductor and to said electrical conductor means respectively, to establish for each coincidence of said short second-source pulses with one of said first-source pulses a pair of orthogonal magnetic fields at segments of said magnetic storage device that are adjacent to and lie beyond the ends of said data bit location so that the magnetic states of said segments are progressively reversed in a direction outwardly of said data bit location for each occurrence of a second-source pulse thereby to increase the effective storage length of said data bit location..

2. A magnetic memory, as claimed in claim 1 wherein said memory further comprises an electrically conductive area, said magnetic storage means being positioned between said conductive area and said electrical conductor means, said conductive area acting to amplify said the magnetic field established by said second source pulses, whereby the summation of said two fields is of a level to progressively switch the magnetic remanent state of said segments of said magnetic conductor.

3. A magnetic memory, as claimed in claim 1, wherein said second source pulses are of alternate polarity, whereby the magnetic field established by one of said polarities switches portions of said magnetic conductor that are on one side of said non-magnetic conductor and partially switches portions on the same side of said non-magnetic conductor that are adjacent thereto, and the magnetic field established by the other of said polarities switches portions of magnetic conductor that are on the other side and partially switches portions adjacent thereto, so that each recurrence of said pulses progressively switches said segments of said magnetic conductor.

4. A magnetic memory, as claimed in claim 3, wherein said first-source pulses are of one polarity or another, said polarity being controlled by said control means to determine the remanent state of said segments.

5. A magnetic memory, as claimed in claim 3, wherein said control means is operable to connect said second pulse source to said electrical conductor means whereby pulses of said one polarity cause a switch of the magnetic flux in a relatively small portion of said data bit location between said segments and the pulses of the opposite polarity acting with the magnetic forces on each side of said relatively small portion to cause a restoration of said switched flux thereby providing non-destructive interrogation, the switching of said flux inducing a voltage in said non-magnetic conductor, and comprising amplifier means coupled to said non-magnetic conductor for sensing said voltage.

References Cited by the Examiner

UNITED STATES PATENTS

| | | | |
|---|---|---|---|
| 3,069,665 | 12/1962 | Bobeck | 340—174 |
| 3,084,336 | 4/1962 | Clemons | 340—174 |
| 3,105,962 | 10/1963 | Bobeck | 340—174 |
| 3,126,529 | 3/1964 | Hempel | 340—174 |
| 3,133,271 | 5/1964 | Clemons | 340—174 |
| 3,163,855 | 12/1964 | Bobeck | 340—174 |
| 3,189,879 | 6/1965 | MacIntyre | 340—174 |
| 3,231,874 | 1/1966 | James | 340—174 |
| 3,264,621 | 8/1966 | Gray | 340—174 |

BERNARD KONICK, *Primary Examiner.*

M. S. GITTES, *Assistant Examiner.*